(12) United States Patent
Margavio et al.

(10) Patent No.: US 11,529,583 B2
(45) Date of Patent: Dec. 20, 2022

(54) DESICCANT SATURATION LEVEL MONITORING

(71) Applicant: Raytheon Company, Waltham, MA (US)

(72) Inventors: Daniel P. Margavio, McKinney, TX (US); Christopher L. Smith, Van Alstyne, TX (US); Tiffany Pouw, Dallas, TX (US); James Johnson, Allen, TX (US)

(73) Assignee: Raytheon Company, Waltham, MA (US)

( * ) Notice: Subject to any disclaimer, the term of this patent is extended or adjusted under 35 U.S.C. 154(b) by 393 days.

(21) Appl. No.: 16/682,403

(22) Filed: Nov. 13, 2019

(65) Prior Publication Data

US 2021/0138386 A1 May 13, 2021

(51) Int. Cl.
*B01D 53/02* (2006.01)
*B01D 53/04* (2006.01)
*B01D 53/26* (2006.01)
*G01M 3/02* (2006.01)
*H02K 9/26* (2006.01)

(52) U.S. Cl.
CPC ....... *B01D 53/0454* (2013.01); *B01D 53/261* (2013.01); *G01M 3/02* (2013.01); *H02K 9/26* (2013.01)

(58) Field of Classification Search
CPC ... B01D 53/0454; B01D 53/261; G01M 3/02; G01N 21/81; H02K 9/26
See application file for complete search history.

(56) References Cited

U.S. PATENT DOCUMENTS

| | | | |
|---|---|---|---|
| 5,187,363 A | 2/1993 | Birkle | |
| 6,110,261 A * | 8/2000 | Guiragossian | G06F 15/8007 96/147 |
| 2006/0067645 A1 | 3/2006 | Gally et al. | |
| 2008/0110337 A1* | 5/2008 | Hoffman | B01D 53/261 95/3 |
| 2010/0319303 A1* | 12/2010 | Portier | B01J 20/12 53/432 |

(Continued)

FOREIGN PATENT DOCUMENTS

| | | |
|---|---|---|
| DE | 10 2017 004 945 A1 | 11/2018 |
| EP | 1 920 983 A2 | 11/2007 |

(Continued)

OTHER PUBLICATIONS

PCT International Search Report and Written Opinion dated Oct. 27, 2020 for International Application No. PCT/US2020/047298; 13 Pages.

(Continued)

*Primary Examiner* — Christopher P Jones
(74) *Attorney, Agent, or Firm* — Daly Crowley Mofford & Durkee, LLP (57) ABSTRACT

Methods and apparatus for a desiccant saturation monitoring system having a body with a first portion configured to hold a desiccant material and a second portion configured to position a sensor in relation to the desiccant material. A light source can irradiate the desiccant material and the sensor can detect irradiance from the desiccant material for at least one wavelength to determine saturation information for the desiccant material.

20 Claims, 9 Drawing Sheets

(56) References Cited

U.S. PATENT DOCUMENTS

| | | | |
|---|---|---|---|
| 2012/0255437 A1* | 10/2012 | Fornof | B01D 53/261 95/45 |
| 2015/0153051 A1* | 6/2015 | Pahwa | F24F 3/1423 95/10 |
| 2020/0158654 A1* | 5/2020 | Pore | G01N 21/25 |

FOREIGN PATENT DOCUMENTS

| | | |
|---|---|---|
| EP | 3 154 070 A1 | 4/2017 |
| JP | 2011-016098 A | 1/2011 |

OTHER PUBLICATIONS

PCT International Preliminary Report on Patentability dated May 27, 2022 for International Application No. PCT/US2020/047298; 8 Pages.

* cited by examiner

DESICCANT SATURATION LEVEL MONITORING

BACKGROUND

Embedded desiccant assemblies protect against moisture intrusion by adsorbing water from a partially or fully sealed enclosure. Some sensors, such as electro-optic sensors, are particularly sensitive to moisture intrusion. However, the function of the desiccant degrades as the desiccant material saturates with moisture.

Conventional techniques to detect saturation include relative humidity measurement of the desiccated volume. Other systems use desiccant that changes color to indicate when saturation occurs. The desiccant material is viewed and subjectively evaluated for saturation levels.

SUMMARY

Embodiments of the invention provide methods and apparatus for desiccant saturation level monitoring that can generate a signal that reflects a moisture saturation state of a desiccant material in a desiccated volume. In embodiments, a system includes a calibrated photonic sensor within a desiccated volume that reports spectral response changes of the desiccant material during saturation transition with high sensitivity. The signal reported by the sensor can be read in real-time to monitor the function of the desiccant. As the desiccant approaches saturation, the material can be replaced.

In one aspect, a system comprises: a sensor; a body having a first portion configured to hold a desiccant material and a second portion configured to position the sensor in relation to the desiccant material, wherein the desiccant material is configured to adsorb moisture in a desiccated volume; and a light source configured to illuminate the desiccant material, wherein the sensor is configured to detect irradiance from the desiccant material for at least one wavelength to determine saturation information for the desiccant material.

A system may further include one or more of the following features: the sensor comprises a photosensor, the sensor comprises a red, green, blue (RGB) sensor, the sensor is configured to detect irradiance from the desiccant material for red, green and blue wavelengths, the system includes memory to store wavelength information that corresponds to saturation levels of the desiccant material, the system comprises a sensor assembly containing the desiccated volume, the desiccated volume is non-hermetically sealed, the body comprises an observation chamber to position the sensor a given distance from the desiccant material, the saturation information comprises a percentage of saturation for the desiccant material, the light source is configured to emit visible light, and/or the system is secured to an aircraft.

In another aspect, a method comprises: employing a body having a first portion configured to hold a desiccant material and a second portion configured to position a sensor in relation to the desiccant material, wherein the desiccant material is configured to adsorb moisture in a desiccated volume; and illuminating the desiccant material with a light source, detecting irradiance, by the sensor, from the desiccant material for at least one wavelength to determine saturation information for the desiccant material.

A method can further include one or more of the following features: the sensor comprises a photosensor, the sensor comprises a red, green, blue (RGB) sensor, the sensor is configured to detect irradiance from the desiccant material for red, green and blue wavelengths, the desiccated volume is non-hermetically sealed, the body comprises an observation chamber to position the sensor a given distance from the desiccant material, and/or the saturation information comprises a percentage of saturation for the desiccant material.

In a further aspect, a system comprises: a means for holding a desiccant material and positioning a sensor in relation to the desiccant material, wherein the desiccant material is configured to adsorb moisture in a desiccated volume; and a light source configured to illuminate the desiccant material, wherein the sensor is configured to detect irradiance from the desiccant material for at least one wavelength to determine saturation information for the desiccant material.

BRIEF DESCRIPTION OF THE DRAWINGS

The foregoing features of this invention, as well as the invention itself, may be more fully understood from the following description of the drawings in which.

DETAILED DESCRIPTION

Figure 1:
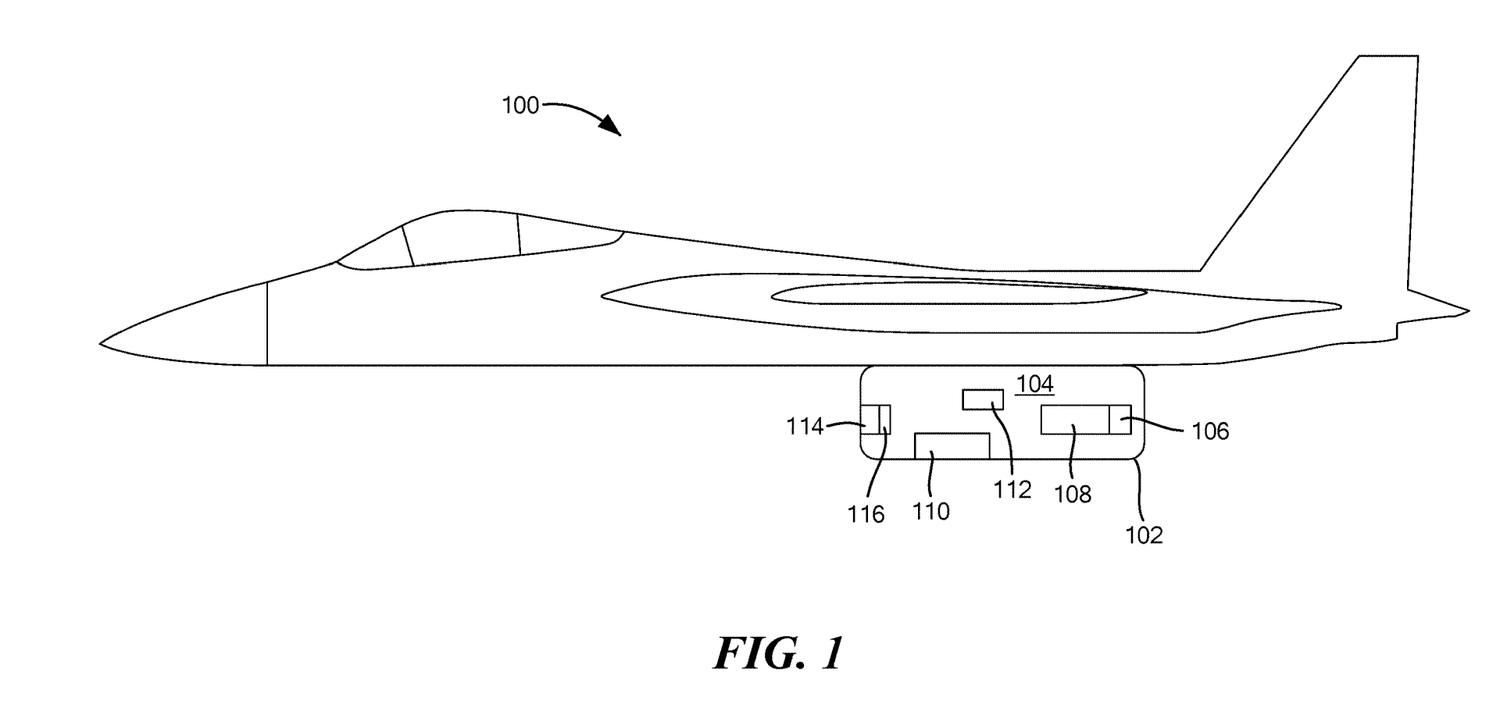
FIG. 1 is a schematic representation of a platform including an attached assembly having a desiccant saturation level monitoring system for a desiccated volume.

FIG. 1 shows an example platform 100, such as an aircraft, having a sensor assembly 102 that has a desiccated volume 104 which is partially sealed. A desiccant saturation monitoring system 106 monitors a saturation level of desiccant material 108 that adsorbs moisture from the desiccated volume 104. The sensor assembly 102 can include a sensor 110, such as an electro-optic sensor, coupled to a processing module 112, which can contain circuitry and other components that are environmentally sensitive. In embodiments, the sensor assembly 102 can include a connection 114 to outside air. The connection can include a mechanism 116, such as a check valve, to manage air flow in to and out of the desiccated volume 104.

In the illustrated embodiment, the platform 100 comprises an aircraft which ascends in altitude and descends back to lower altitudes. As is well known, the air has different characteristics, e.g., temperature, humidity, pressure, etc., at different altitudes and locations. As the aircraft 100 descends at different locations, the amount of moisture in the partially sealed desiccated volume 104 may increase. If there is some level of moist air intake into the partially sealed volume 104 at one altitude, after a change in location and/or altitude to a cooler temperature, condensation can form on surfaces within the partially sealed volume 104 if the desiccant material is saturated. The undesirable effects, e.g., biological growth, rust, corrosion, optical coating damage, and circuitry degradation will occur after prolonged exposure to this condition.

As used herein, partially sealed refers to a volume that is non-hermitically sealed. The air in the desiccated volume has at least one characteristic that is different than outside air. It is understood that amount of air flow in to and out of the desiccated volume 104 can vary from almost complete hermetic seal to almost free flow of outside air depending upon the application. In addition, while example embodiments are shown and described in conjunction with a desiccated volume containing air, it is understood that the desiccated volume can contain any suitable fluid and desiccation material.

While example embodiments are shown and described in conjunction with an aircraft, it is understood that embodiments of the invention are applicable to systems in general in which it is desirable to determine the level of saturation of a desiccant material. For example, vehicles, fixed structures, submarines, unmanned aerial vehicles, unmanned underwater vehicles, autonomous vehicles, medical devices, medicine delivery systems, molecule filtering systems, implantable biological function sensors, and the like may have sealed or partially sealed enclosures of some kind for which desiccant monitoring is desirable. In addition, it is understood that desiccated volumes can be internal to a platform or can be removably attached to a platform.

It is understood that the same issues exist for ground vehicles as well due to exposure to weather (rain, snow, fog, etc.) but also just to diurnal cycling which causes day-to-day pressure fluctuations which may drive moisture into the volume and gas migration. This may slowly cause moisture intrusion past any non-hermitic seal.

Figure 2A:
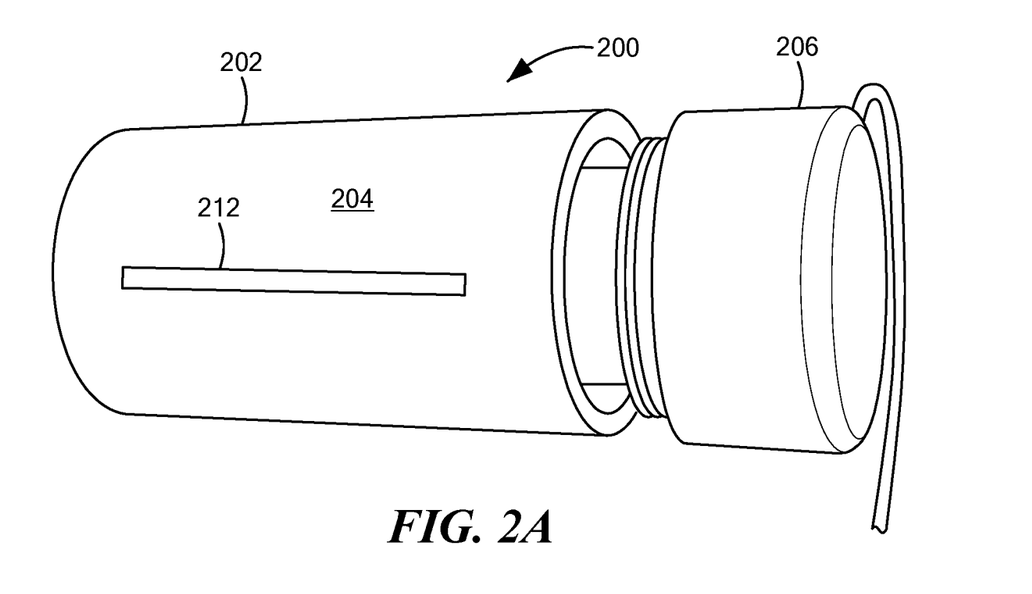
FIG. 2A is a pictorial representation and FIG. 2B is a lengthwise cross-sectional view of a desiccant saturation monitoring system.
Figure 2B:
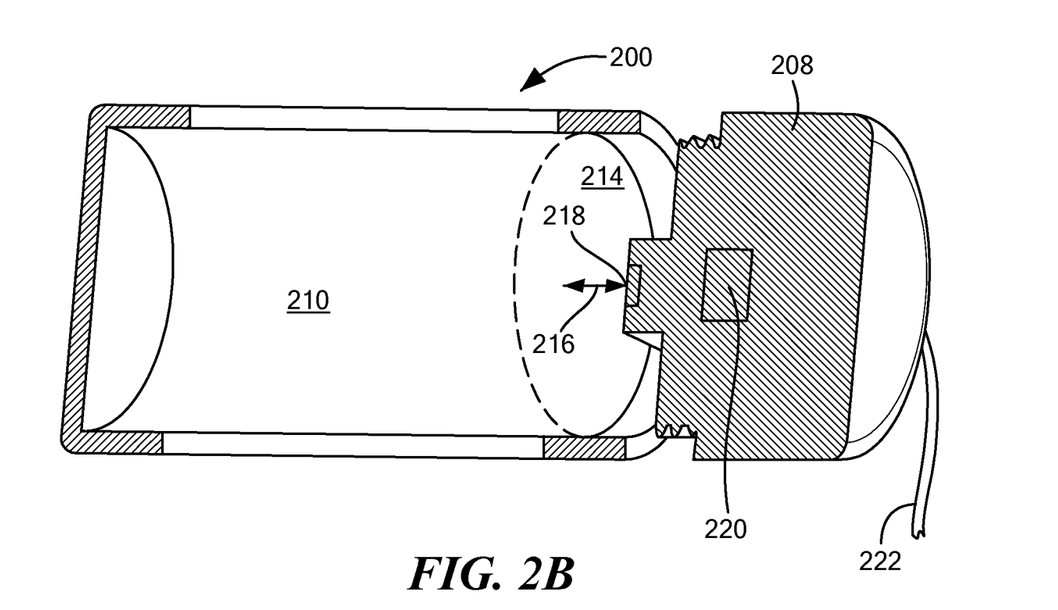

FIG. 2A is a perspective view and FIG. 2B is a cross-sectional side view of an example desiccant saturation level monitoring system 200 in accordance with an example embodiment. A body includes a first portion 202 that defines a desiccant container 204 and a second portion 206 that includes a sensor system 208 to obtain moisture saturation information of a desiccant material 210 in the container 204 for adsorbing moisture in a desiccated volume, such as the desiccated volume 104 of FIG. 1.

In embodiments, the first portion 202 includes one or more apertures 212 to enable air flow into the container 204 for adsorbing moisture within the desiccated volume. In the illustrated embodiment, the aperture 212 is shown as an elongate slot. The apertures 212 can be formed in any practical number, geometry, and location to meet the needs of a particular application. For example, different systems may have different rates of air flow that require a given rate of moisture adsorption. For example, the container 204 can include a pressure valve (configured to open when the outside air pressure is several PSIA different than the internal pressure) through an opening which allows outside air to be directed into the cavity filled with desiccant 210. Another opening similar to aperture 212 allows this outside air to freely flow into the product's desiccated volume 104. The function of these pair of openings to ensure outside air is forced through the desiccant material at least once and is therefore mostly devoid of moisture.

At the intersection of the first and second portions 202, 206, the desiccant monitoring system 200 includes an observation chamber 214 that provides a standoff distance 216 between a sensor 218 and the desiccant material 210. In embodiments, the sensor 218 and a surface of the desiccant material 210 should remain at a given distance to ensure accurate data. The sensor 218 can be coupled to a signal processing module 220 for processing signal information from the sensor 218. The signal processing module 220 can be connected to remote processing modules via a suitable cable 222.

In embodiments, suitable example desiccant materials include silica-gel type, 4A synthetic zeolite-type materials with heavy metal salt additives, and the like.

MIL-DTL-87934C specifies the performance and behavior of molecular sieve desiccants including those with color changing properties due to metal salt additives that are suitable for embodiments, An example desiccant material is available at https://www.sorbentsystems.com/bulksorbent-s.html. Suitable silica-gels include part number 640AG05. It is understood that any suitable desiccant material be used that has the property of changing color based upon a level of moisture saturation.

Irradiance refers to the radiant flux received by a surface per unit area, such as watts per square meter ($W \cdot m^{-2}$). In embodiments, irradiance refers to what is being measured by example sensors, which can also be referred to as intensity. In embodiments, each photodetector within the sensor is treated with one or more filters to block undesirable wavelengths of light. The result is that the sensor takes irradiance measurements in independent spectral bands, e.g., colors. Since the photodetectors are essentially in the same physical location and looking in the same direction, in embodiments, the relative response between the spectral band measurements provide an accurate assessment of the color of the observed object. In embodiments, a white light emitting source is the source of the light reflected off of the desiccant material.

It is understood that by convention the function of desiccant materials is defined by the amount of moisture it can adsorb as a percentage of its mass. For example, a desiccant material can be defined as having a moisture absorption capacity of twenty percent of its mass.

Figure 3:
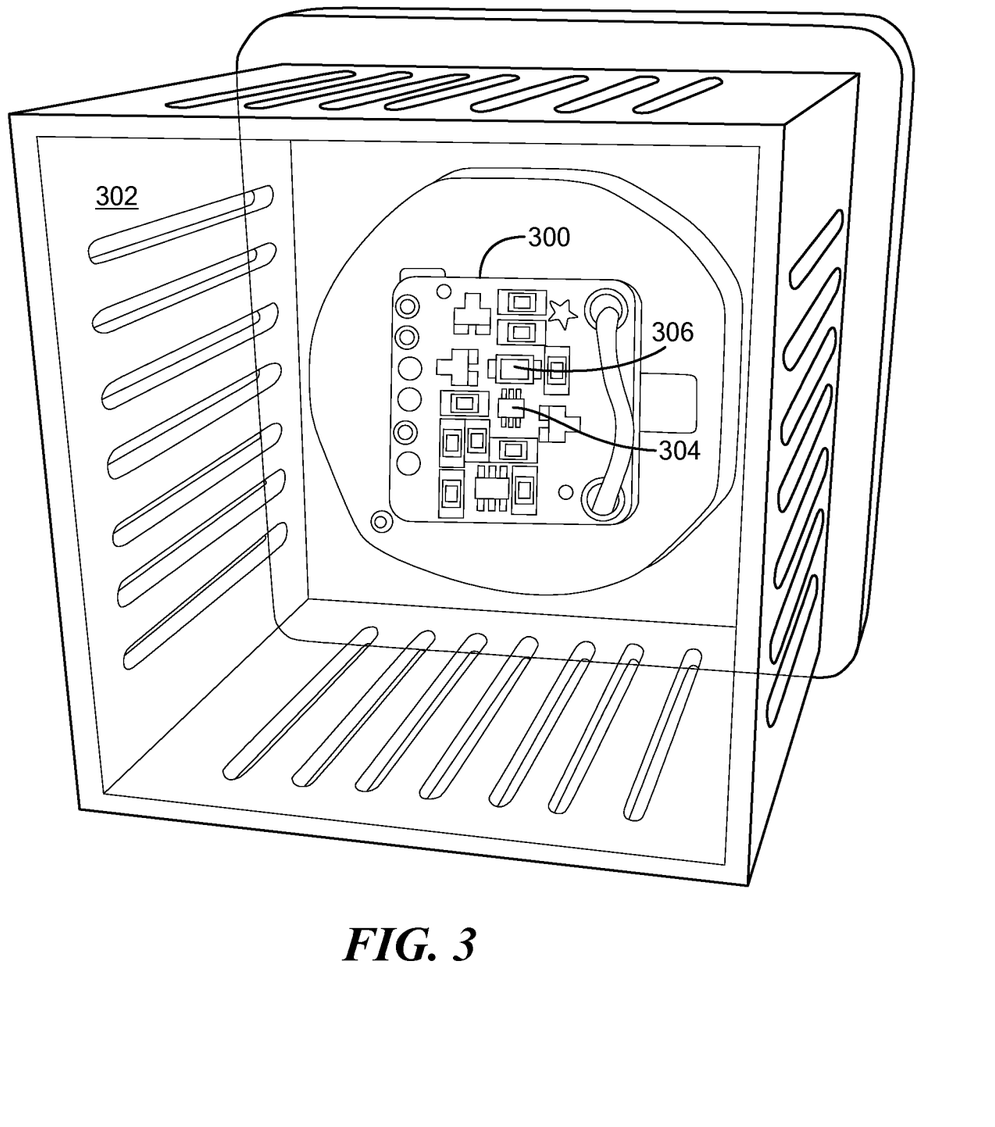
FIG. 3 shows an example sensor for a desiccant saturation level monitoring system.

FIG. 3 shows an example photosensor assembly 300 for detecting irradiance characteristics of desiccant material. In the illustrated embodiments, the photosensor assembly 300 is located at an end of a container 302 (shown without desiccant material) having a series of slots to allow airflow into the container. Note that the container 302 is shown without the bottom. The photosensor 304 is configured to be a certain distance from the surface of desiccant material to provide consistent signal readings.

The photosensor assembly 300 senses the spectral response of the desiccant material when the integrated light source 306 is active. In embodiments, an infrared window can filter the energy received by the photosensor 300. Infrared filtering can be performed at the standoff window or immediately in front of the photodetectors, for example.

Figure 4:
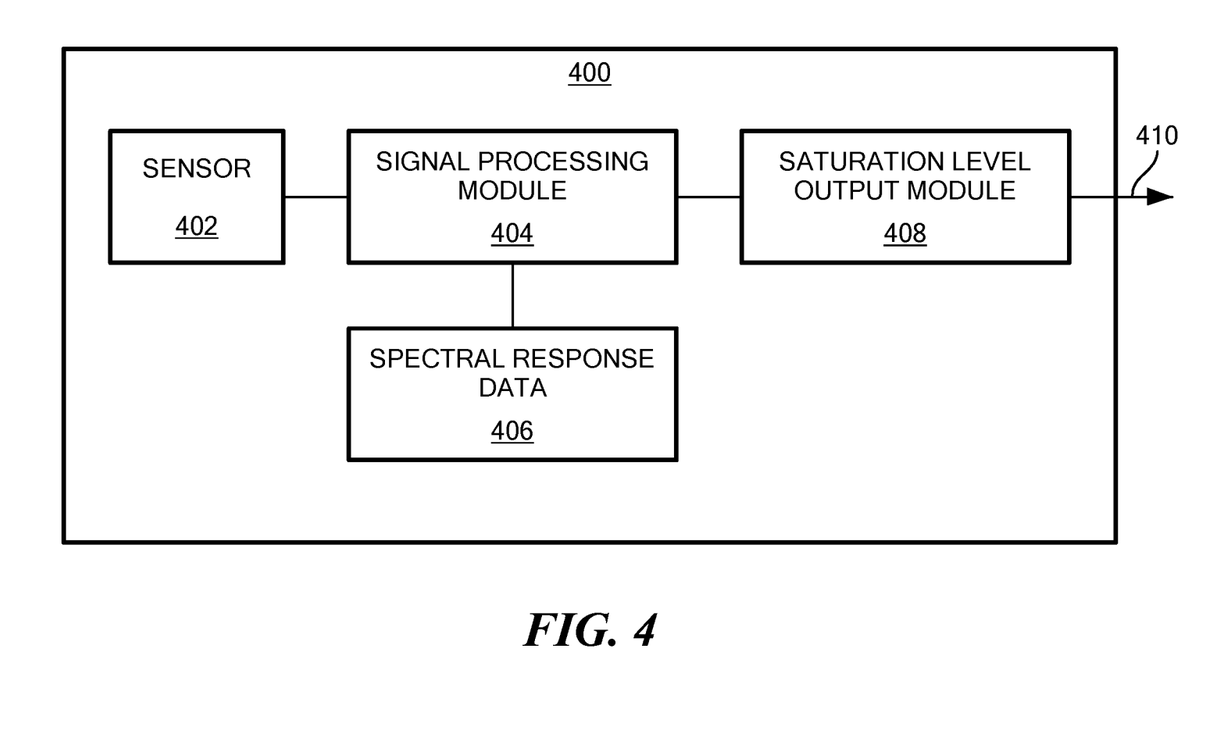
FIG. 4 is a block diagram of a desiccant saturation level monitoring system.

FIG. 4 is a high-level block diagram of an example desiccant saturation monitoring system 400 including a sensor 402, such as the photosensor of FIG. 3, to receive reflected light from desiccant material. A signal processing module 404 can receive the spectral response data from the sensor 402. In embodiments, the system 400 can include stored spectral response and desiccant saturation level data 406 for comparison with present spectral response data. Based on the present spectral response data, the current desiccant saturation level can be determined and provided to a saturation level output module 408 which can output a desiccant saturation level signal 410.

The desiccant saturation level signal 410 can comprise a variety of formats. In one embodiment, the desiccant saturation level signal 410 is active when the desiccant is above a saturation threshold. Thus, the desiccant saturation level signal 410 can serve as a flag that the desiccant material should be replaced. In other embodiments, the desiccant saturation level signal 410 comprises percent saturation information. In some embodiments, the desiccant saturation level signal 410 comprises saturation prediction information. For example, based on historical desiccant saturation changes on per flight basis, the desiccant saturation level signal 410 can predict when the saturation level will reach a given saturation threshold level.

In other embodiments, the current spectral response is processed by the signal processing module 404 using one or more algorithms to generate a current desiccant saturation level. For example, ratios of two or more wavelengths of the spectral response can be computed and then calibrated using laboratory reference measurements to determine an estimated desiccant saturation level.

In embodiments, the signal processing module 404, spectral response data 406 and saturation level output module 408 are local to the sensor 402. In other embodiments, these components are remote from the sensor 402. For example, data from the sensor 402 can be provided to a central control or signal processing module.

In embodiments, a desiccant material saturation level monitoring system includes a photosensor that measures irradiance at one or more wavelengths. In some embodiments, the photosensor measures irradiance from the desiccant material at red (R), green (G), and blue (B) wavelengths. The photosensor can comprise an RGB sensor.

While embodiments are shown and described using red, green, and blue light measurements, it is understood that other wavelengths can be used and that any practical number of wavelengths can be measured to meet the needs of a particular application or a selected desiccant material. In some embodiments, wavelengths in the non-visible spectrum are measured and processed.

Figure 5A:
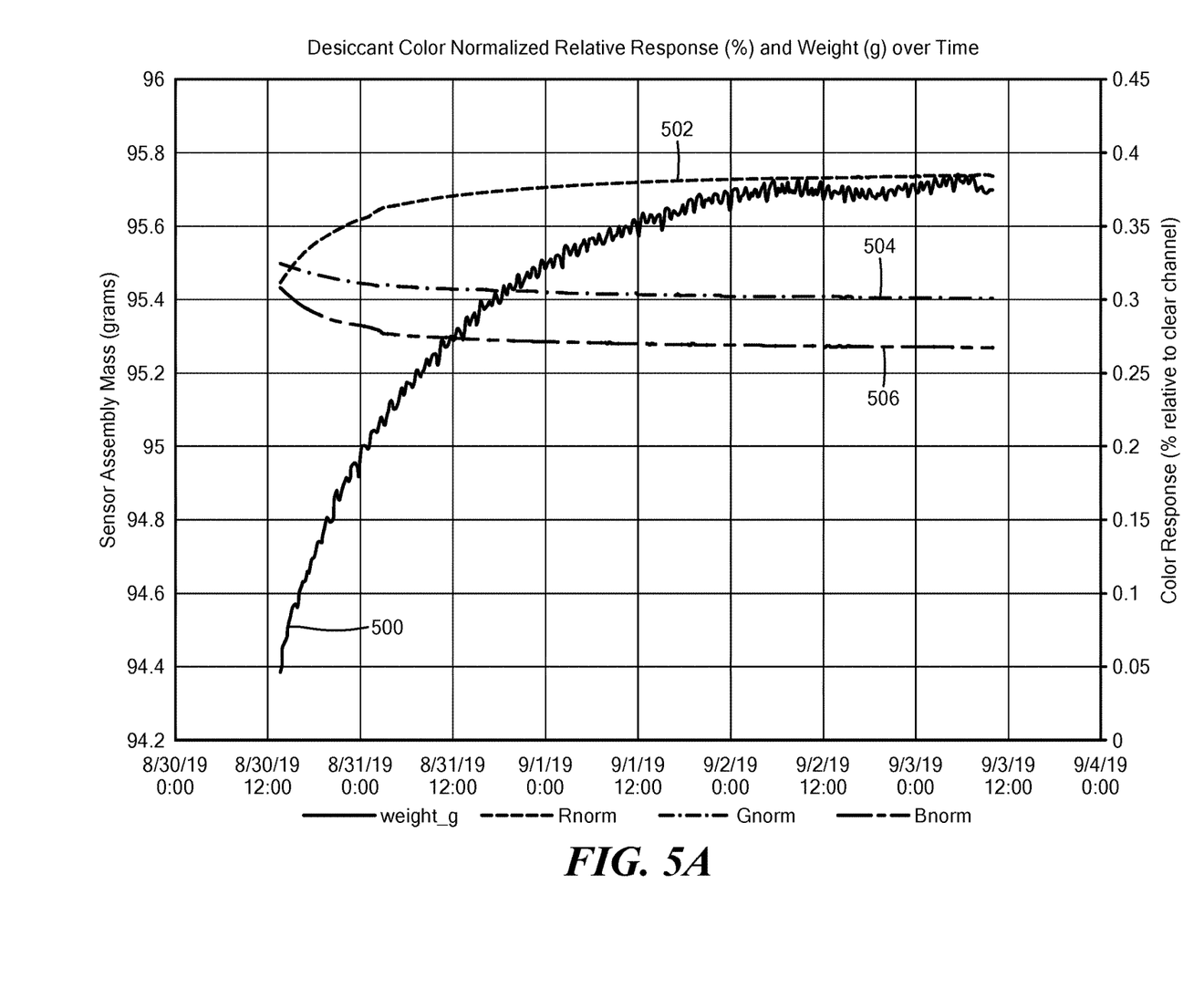
FIG. 5A is a plot of desiccant saturation level and irradiance data over time for a desiccant material.

FIG. 5A is an example waveform for data collection during calibration showing the relationship between the mass 500 of a desiccant material and spectral response over time for a first wavelength signal 502, which is red (R) in the illustrated embodiment, a second wavelength signal 504, which is green (G) in the illustrated embodiment, and a third wavelength signal 506, which is blue (B) in the illustrated embodiment. In embodiments, the red, green and blue signals 502, 504, 506, can be obtained using an RGB photosensor. The red, green and blue signals 502, 506, 506 should each define a given wavelength corresponding to calibration. As is known in the art, the wavelengths for R, G, B and other wavelengths can vary from RGB sensor type, as well as from sensor to sensor. As can be seen, the mass 500 of the desiccant material increases and levels off as saturation is reached.

As can be seen, the red, green, and blue signals 502, 504, 506 monotonically change as the desiccant mass 500 increases. In the illustrated embodiment, the mass 500 of the desiccant material is shown changing over a period of eight days. The R, G, B signals 502, 504, 506 can be combined, such as by algorithm processing to generate the change in mass 500 of the desiccant.

Figure 5B:
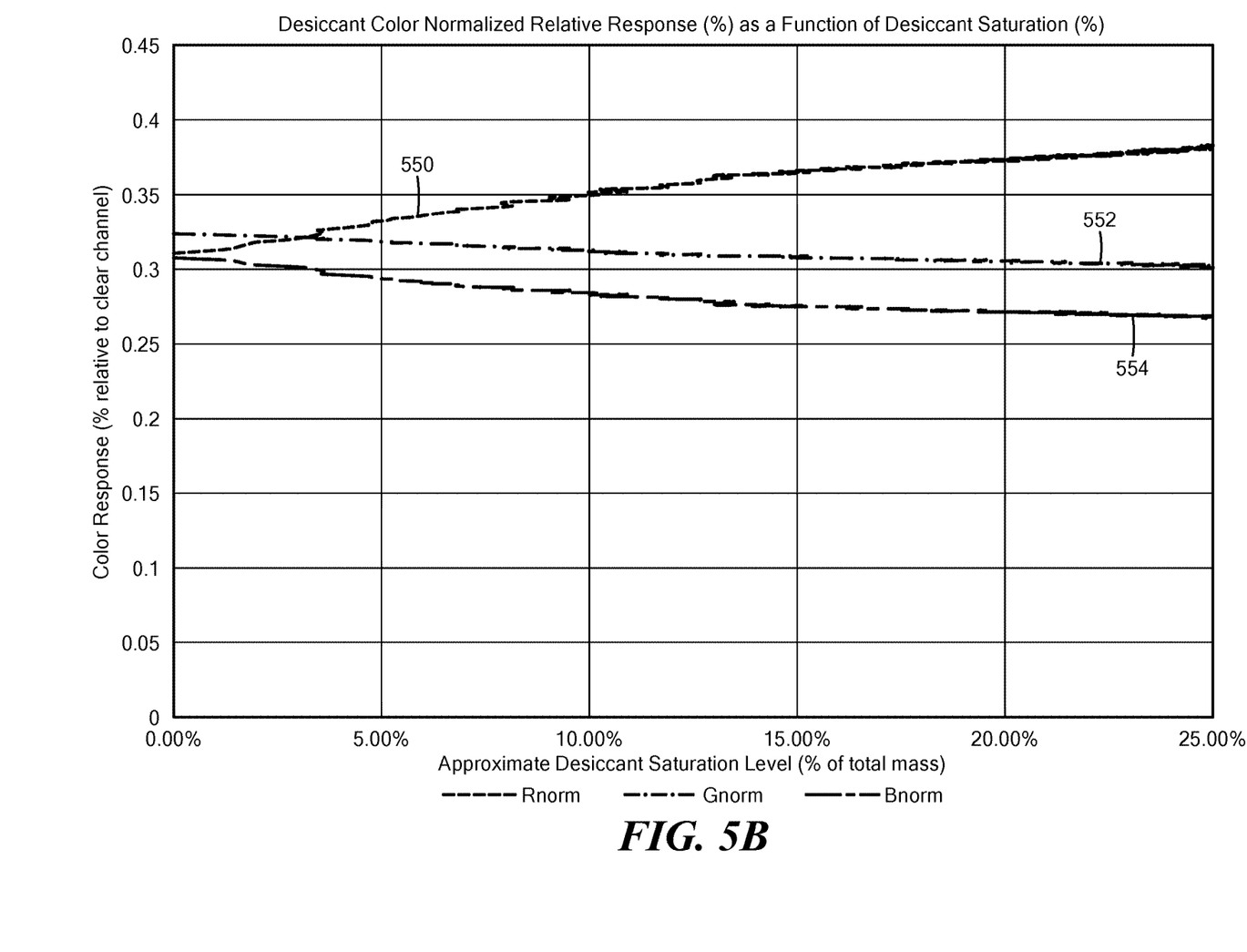
FIG. 5B is a plot of irradiance for given wavelengths versus desiccant saturation level.

FIG. 5B is an example waveform diagram for sensor calibration showing first, second and third wavelength signals 550, 552, 554 as the saturation level of a desiccant material increases from 0.00 percent to 25.00 percent (x-axis). In the illustrated embodiment, the first wavelength 550 corresponds to R, the second wavelength 552 corresponds to B, and the third wavelength 554 corresponds to G. As can be seen, any given desiccant saturation level along the x-axis corresponds to unique values for R, G, B. When the desiccant experiences color changes while becoming saturated, the photosensor can sense values for the R, G, B signals and determine the desiccant saturation level. It will be appreciated that RGB values can be stored for some set of saturation levels at a given granularity. In an alternative embodiment, the RGB values can be processed to determine a unique relative relationship to a given saturation level. For example, at least one of an R/G ratio, a B/G ratio, and/or a GB ratio can correspond to a given saturation level.

It is understood that signal wavelength data from the sensor can be processed in a variety of ways. In some embodiments, a single wavelength may be processed to determine desiccant material saturation levels. In other embodiments, relationships between R, G, B data, for example, can be used to determine saturation levels.

Figure 5C:
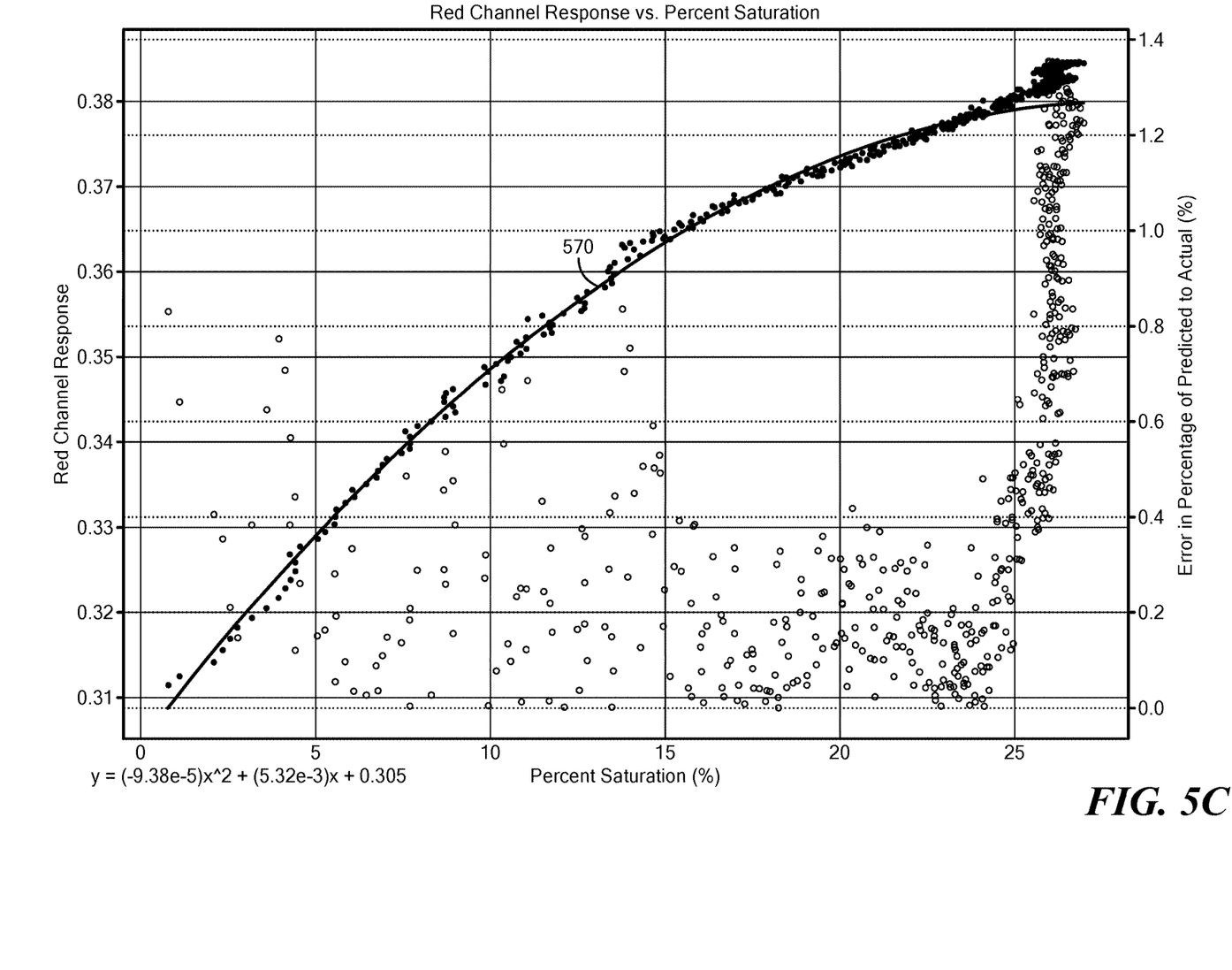
FIG. 5C is a plot of a wavelength versus a percentage saturation of a desiccant material.

FIG. 5C shows an example plot of predicted desiccant material saturation level 570 based on a red channel response (shown as the nearby dots) normalized to the overall response. In one particular embodiment, the predicted desiccant material saturation level 570 is defined by an equation where x=red channel response and y=predicted desiccant saturation level. The example equation is $y=(-9.38e-5)x^2+(5.32e-3)x+0.305$. In the illustrated embodiment, irradiance measurements for a single channel (red) can be converted into a predicted desiccant saturation level. The dots on the right side show the percent error of the predicted desiccant saturation level to the actual saturation level as measured by mass.

Figure 6:
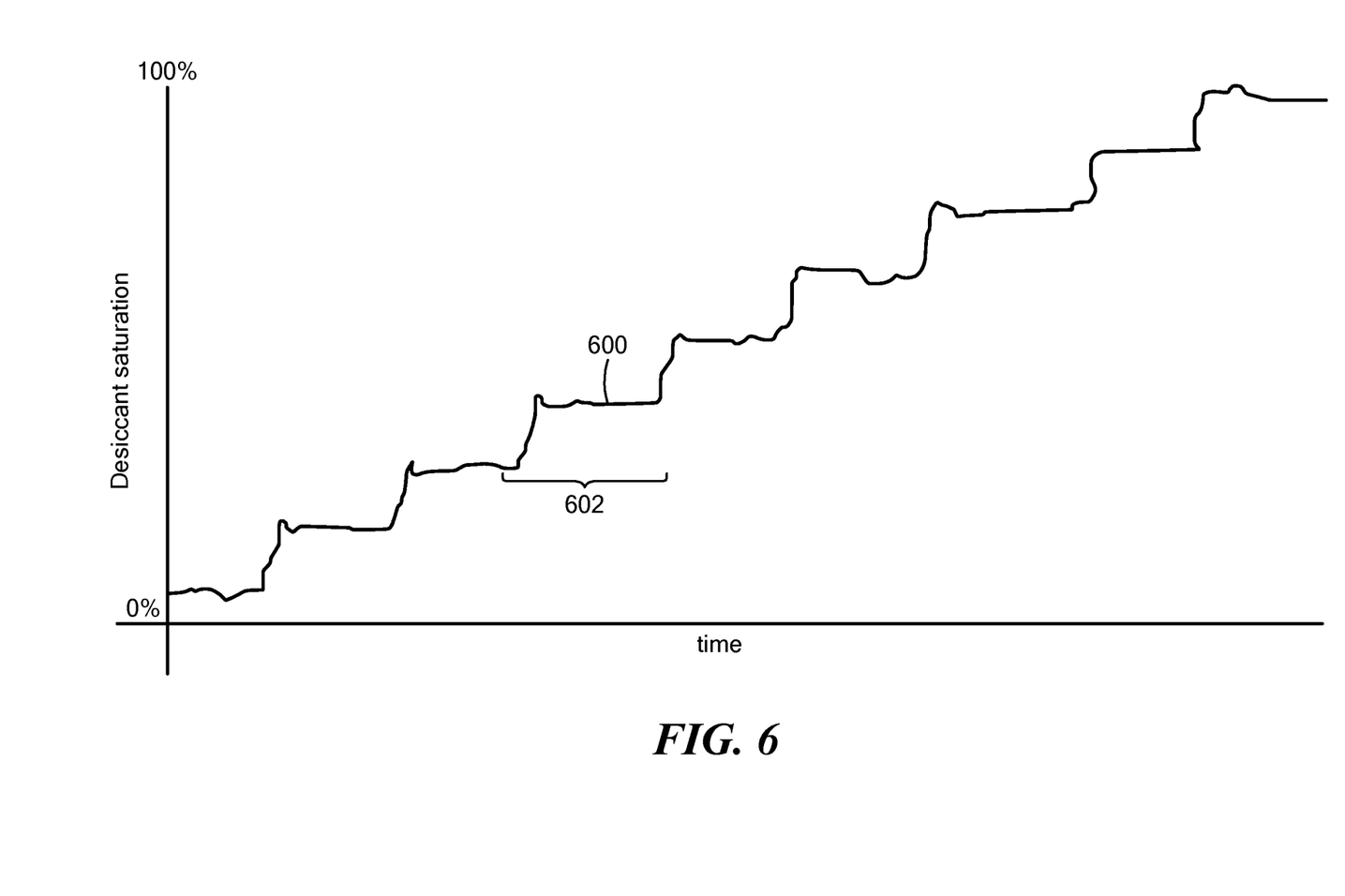
FIG. 6 is a plot of desiccant saturation level over time for a notional desiccant saturation level monitoring system on an aircraft.

FIG. 6 shows notional desiccant saturation level 600 over time which increases in steps that may correspond to aircraft flights or missions. For example, each flight may correspond to a step 602 increase in desiccant saturation level 600. It is understood that the size and duration of the steps can vary based upon the outside air characteristics, such as humidity and temperature, and flight parameters, such as altitude, duration, and the like.

Figure 7:
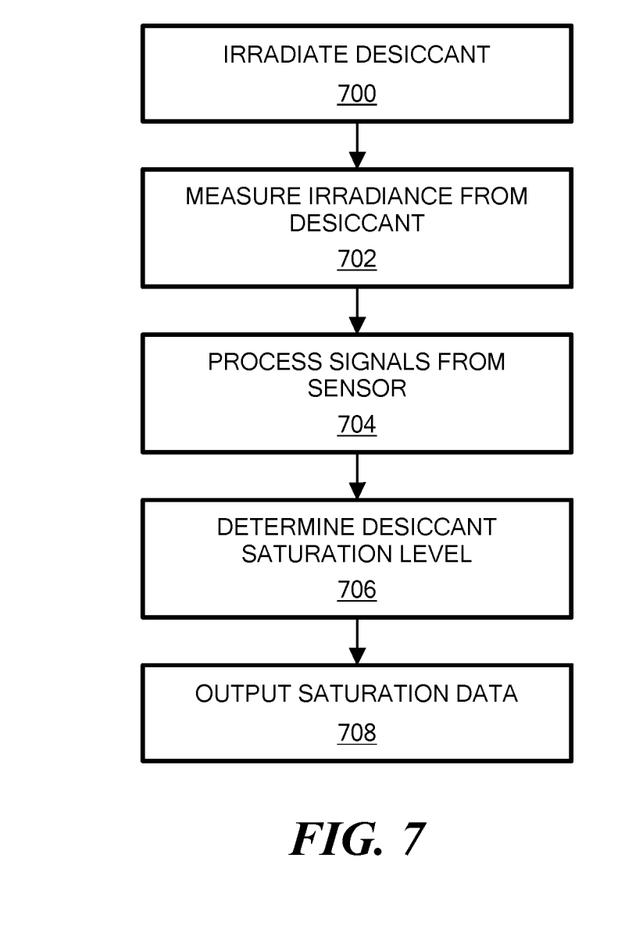
FIG. 7 is flow diagram showing an example sequence of steps for implementing a desiccant saturation level monitoring system.

FIG. 7 is a flow diagram showing an example sequence of steps for monitoring the saturation level of a desiccant material. In step 700, desiccant material is illuminated by a light source, such as a white light emitting diode (LED). In step 702, a photosensor measures the irradiance of the desiccant material. In embodiments, the photosensor measures energy levels, e.g., amplitude, for at least one wavelength. In some embodiments, the photosensor measures R, G, B signal levels.

In step 704, the measured energy levels are processed and in step 706 saturation information for the desiccant material is determined. For example, one or more of R, G, B measurements can be used to compute a predicted desiccant saturation level, as described in FIG. 5C. In embodiments, the saturation information includes a saturation level by percentage. In embodiments, sensor data is subject to low noise amplification in preparation for sampling by an analog-to-digital converter followed by a calibration process which normalizes the measurements for the purpose of making saturation determination. After digital sampling, the resulting measurements may be further processed such as by comparing calibrated measurements to a threshold value. An indication may be generated if saturation has occurred. Further, calibrated measurements may be processed for estimating the desiccant saturation value, as described above. In addition, calibrated measurements can be processed to estimate the remaining time until desiccant saturation will occur and report the time estimate value. In step 708, the determined saturation information is output, such as being transmitted to a remote processing unit. Saturation information, can include, for example, a saturated/unsaturated determination, percent saturation, a predicted time to saturation, etc.

Figure 8:
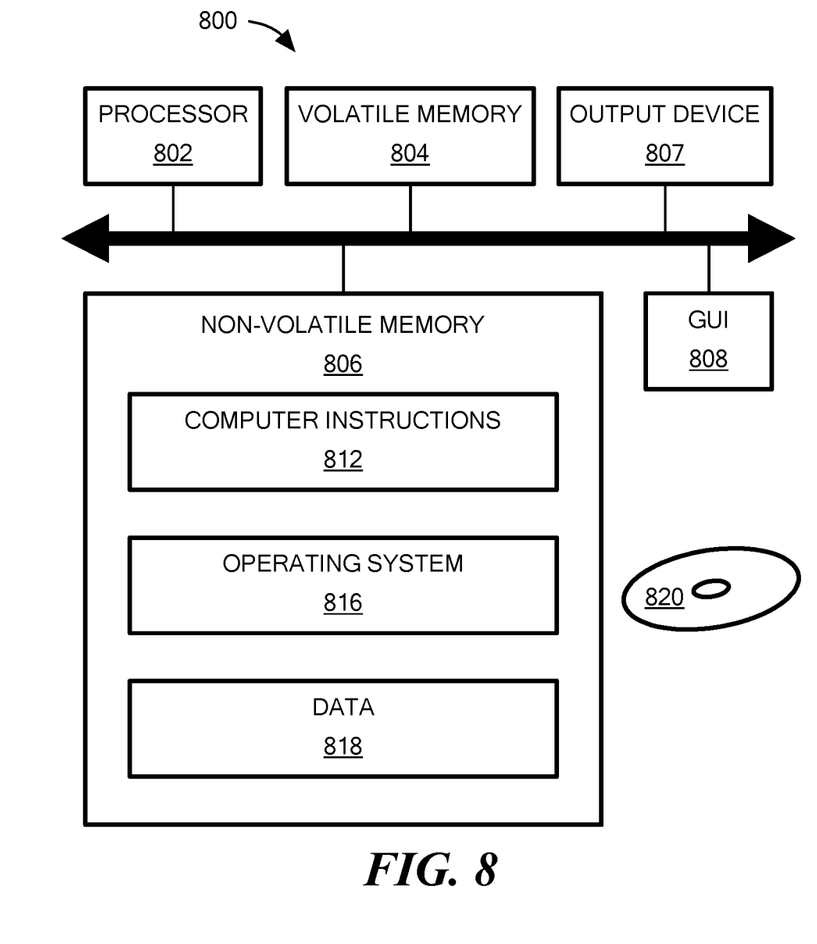
FIG. 8 is a schematic representation of an example computer than can perform at least a portion of the processing described herein.

FIG. 8 shows an exemplary computer 800 that can perform at least part of the processing described herein, such as the processing of FIGS. 2, 3, 4, 5A, 5B, 5C, 6, and 7. For example, the computer 800 can perform processing for the signal processing module 404 of FIG. 4 and the processing steps of FIG. 7. The computer 800 includes a processor 802, a volatile memory 804, a non-volatile memory 806 (e.g., hard disk), an output device 807 and a graphical user interface (GUI) device 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A system, comprising:
    a sensor;
    a body having a first portion configured to hold a desiccant material, a second portion configured to position the sensor in relation to the desiccant material, and an observation chamber positioned between the first portion and the second portion, wherein the observation chamber defines a standoff distance that separates the desiccant material from the sensor, and wherein the desiccant material is configured to adsorb moisture in a desiccated volume;
    at least one valve formed in the body, the at least one valve being configured to manage air flow into and out of the body; and
    a light source configured to illuminate the desiccant material,
    wherein the sensor is configured to detect irradiance from the desiccant material for at least one wavelength to determine saturation information for the desiccant material.

2. The system according to claim 1, wherein the sensor comprises a photosensor.

3. The system according to claim 2, wherein the sensor comprises a red, green, blue (RGB) sensor.

4. The system according to claim 1, wherein the sensor is configured to detect irradiance from the desiccant material for red, green and blue wavelengths.

5. The system according to claim 1, wherein the system includes memory to store wavelength information that corresponds to saturation levels of the desiccant material.

6. The system according to claim 1, wherein the system comprises a sensor assembly containing the desiccated volume.

7. The system according to claim 1, wherein the desiccated volume is non-hermetically sealed.

8. The system according to claim 1, wherein the saturation information comprises a percentage of saturation for the desiccant material.

9. The system according to claim 1, wherein the light source is configured to emit visible light.

10. The system according to claim 1, wherein the system is secured to an aircraft.

11. A method, comprising:
    employing a body having a first portion configured to hold a desiccant material, a second portion configured to position a sensor in relation to the desiccant material, and an observation chamber positioned between the first portion and the second portion, wherein the observation chamber defines a standoff distance that separates the desiccant material from the sensor, and wherein the desiccant material is configured to adsorb moisture in a desiccated volume;

having at least one valve formed in the body, the at least one valve being configured to manage air flow into and out of the body;

illuminating the desiccant material with a light source; and detecting irradiance, by the sensor, from the desiccant material for at least one wavelength to determine saturation information for the desiccant material.

12. The method according to claim 11, wherein the sensor comprises a photosensor.

13. The method according to claim 11, wherein the sensor is configured to detect irradiance from the desiccant material for red, green and blue wavelengths.

14. The method according to claim 11, wherein the desiccated volume is non-hermetically sealed.

15. The method according to claim 11, wherein the saturation information comprises a percentage of saturation for the desiccant material.

16. A system, comprising:
a means for holding a desiccant material and positioning a sensor in relation to the desiccant material, wherein an observation chamber is positioned between the desiccant material and the sensor to define a standoff distance that separates the desiccant material from the sensor, and wherein the desiccant material is configured to adsorb moisture in a desiccated volume;
at least one valve formed in the means for holding the desiccant material and positioning the sensor in relation to the desiccant material, the at least one valve being configured to manage air flow into and out of the body; and
a light source configured to illuminate the desiccant material,
wherein the sensor is configured to detect irradiance from the desiccant material for at least one wavelength to determine saturation information for the desiccant material.

17. The system according to claim 1, wherein the at least one valve comprises a pressure valve configured to open when outside air pressure differs from an internal pressure within the body by a threshold amount, the opening of the valve allowing air flow into the body for adsorbing moisture within the desiccated volume.

18. The system according to claim 1, wherein the body comprises a number of apertures, wherein the number of apertures is selected based on a desired rate of air flow into the system corresponding to a desired rate of moisture adsorption.

19. The system according to claim 18, wherein at least one of a geometry or a location of the apertures in the body is based on the desired rate of air flow in the system corresponding to the desired rate of moisture adsorption.

20. The system according to claim 18, wherein the apertures allow outside air to be directed into a cavity of the first portion of the body that is configured to hold the desiccant material.

* * * * *